(12) United States Patent
Fitch et al.

(10) Patent No.: US 9,342,125 B1
(45) Date of Patent: May 17, 2016

(54) METHOD AND SYSTEM FOR UTILIZING A DEVICE'S USER LOCATION TO MONITOR AND CONTROL THE DEVICE POWER USAGE

(71) Applicants: John Edward Fitch, Woodway, TX (US); James Michael Steward, Crawford, TX (US)

(72) Inventors: John Edward Fitch, Woodway, TX (US); James Michael Steward, Crawford, TX (US)

(73) Assignee: BCP Controls, LLC, Waco, TX (US)

( * ) Notice: Subject to any disclaimer, the term of this patent is extended or adjusted under 35 U.S.C. 154(b) by 296 days.

(21) Appl. No.: 14/011,565

(22) Filed: Aug. 27, 2013

Related U.S. Application Data

(60) Provisional application No. 61/694,113, filed on Aug. 28, 2012.

(51) Int. Cl.
  *G06F 1/32* (2006.01)
  *G06F 11/30* (2006.01)
  *G06F 1/26* (2006.01)

(52) U.S. Cl.
  CPC .............. *G06F 1/26* (2013.01); *G06F 1/3203* (2013.01); *G06F 1/325* (2013.01)

(58) Field of Classification Search
  CPC .......... G06F 1/23; G06F 1/3203; G06F 1/325
  USPC ................... 713/300, 320, 323, 340
  See application file for complete search history.

(56) References Cited

U.S. PATENT DOCUMENTS

| | | | |
|---|---|---|---|
| 6,528,957 B1 | 3/2003 | Luchaco | |
| 7,089,089 B2 | 8/2006 | Cumming et al. | |
| 7,142,994 B2 | 11/2006 | Rao et al. | |
| 7,208,697 B2 | 4/2007 | Blankenship et al. | |
| 7,369,968 B2 | 5/2008 | Johnson et al. | |
| 8,004,271 B2 | 8/2011 | King et al. | |
| 8,024,073 B2 | 9/2011 | Imes et al. | |
| 8,082,065 B2 | 12/2011 | Imes et al. | |
| 8,099,195 B2 | 1/2012 | Imes et al. | |
| 8,108,076 B2 | 1/2012 | Imes et al. | |
| 8,174,381 B2 | 5/2012 | Imes et al. | |
| 8,352,768 B2 | 1/2013 | Starr et al. | |
| 8,484,494 B2 | 7/2013 | Siegel et al. | |
| 2002/0010518 A1 | 1/2002 | Reid et al. | |
| 2006/0036675 A1 | 2/2006 | Crichlow | |
| 2008/0270814 A1* | 10/2008 | Starr et al. | 713/323 |
| 2010/0189208 A1 | 7/2010 | Fudge et al. | |
| 2010/0202566 A1 | 8/2010 | Fudge et al. | |
| 2010/0277280 A1 | 11/2010 | Burkart et al. | |
| 2010/0277283 A1 | 11/2010 | Burkart et al. | |
| 2010/0277285 A1 | 11/2010 | Anderson et al. | |
| 2010/0278214 A1 | 11/2010 | Westcott et al. | |
| 2011/0119515 A1 | 5/2011 | Sadwick | |

(Continued)

FOREIGN PATENT DOCUMENTS

EP        2457132 A1      5/2012

*Primary Examiner* — Michael J Brown

(57) ABSTRACT

The invention pertains to a method and system which monitors attached energy device(s) utilization and allows or inhibits power based on the individual device's user or users current location relative to the device's point of use, the device's effective use range and user based rules. This invention is intended to allow end users to automatically control energy using devices based on the user's real time movement relative to the device in household, workplace, or commercial settings. The energy utilizing device may be either a plug-load, switched-load, or sensor controlled device.

5 Claims, 4 Drawing Sheets

Power Sensing and Control Device
(SPS) Block Diagram

(56) References Cited

U.S. PATENT DOCUMENTS

| | | |
|---|---|---|
| 2011/0173542 A1 | 7/2011 | Imes et al. |
| 2011/0202185 A1 | 8/2011 | Imes et al. |
| 2011/0214060 A1 | 9/2011 | Imes et al. |
| 2011/0224838 A1 | 9/2011 | Imes et al. |
| 2011/0246898 A1 | 10/2011 | Imes et al. |
| 2011/0292869 A1 | 12/2011 | Krieter |
| 2012/0046859 A1 | 2/2012 | Imes et al. |
| 2012/0059530 A1 | 3/2012 | Luo et al. |
| 2012/0064923 A1 | 3/2012 | Imes et al. |
| 2012/0080949 A1 | 4/2012 | Gelonese |
| 2012/0109397 A1 | 5/2012 | Shim et al. |

* cited by examiner

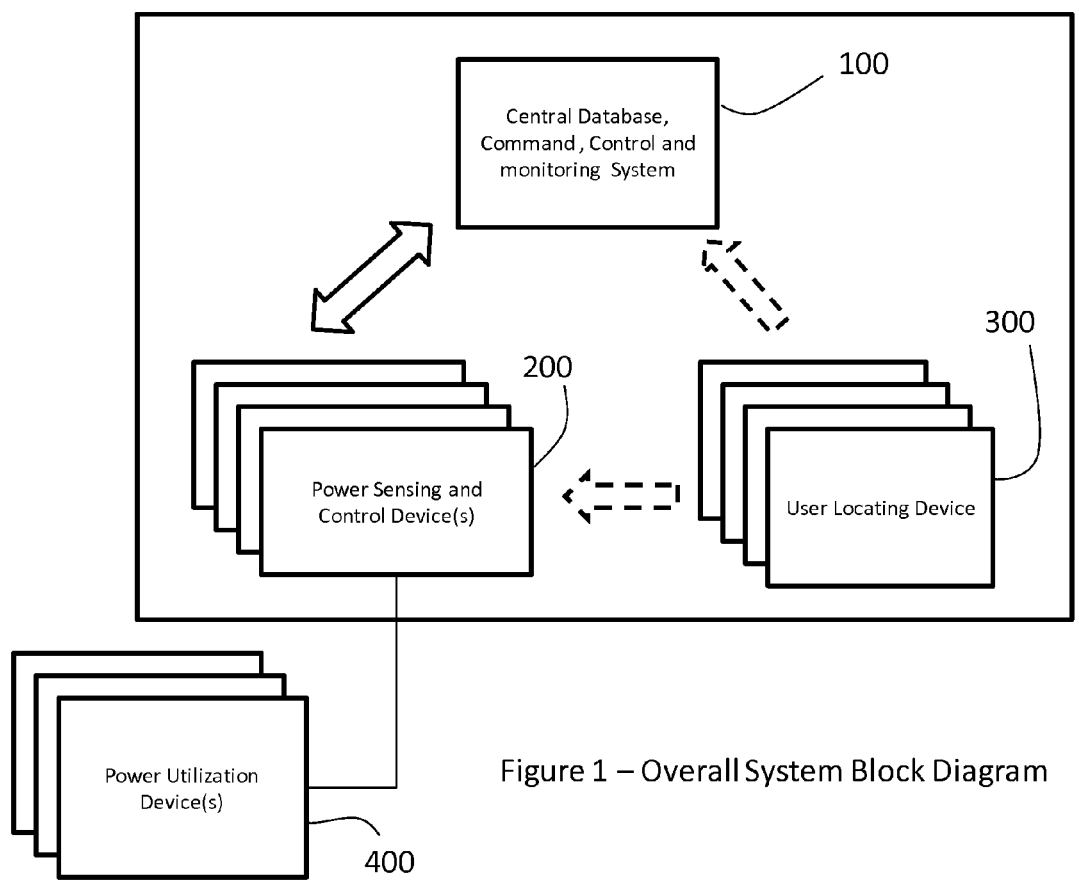
Figure 1 – Overall System Block Diagram

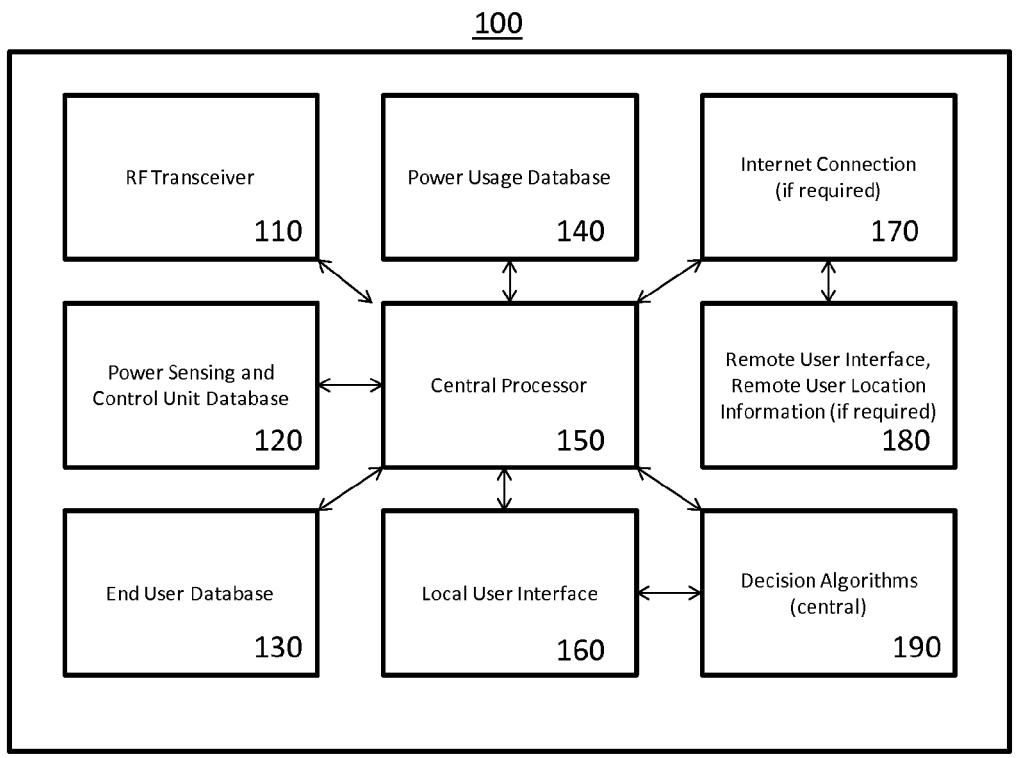
Figure 2 – Central Database command, control and monitoring block diagram (CR)
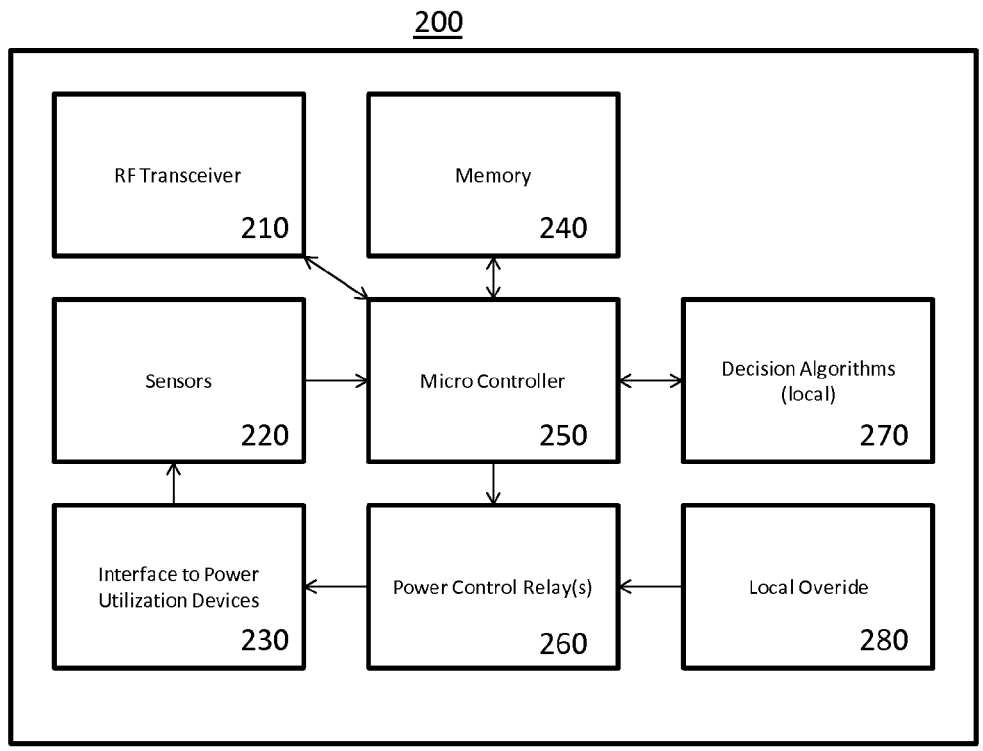
Figure 3 – Power Sensing and Control Device (SPS) Block Diagram

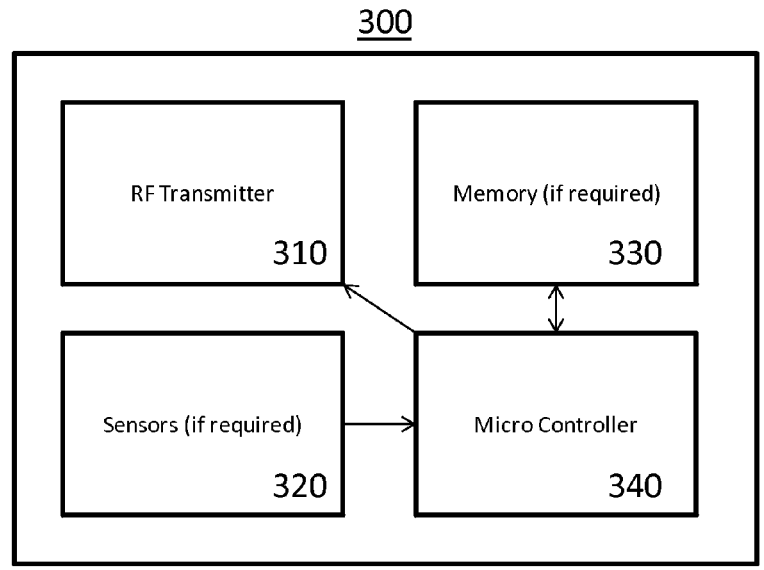
Figure 4 – User Location Device (UD) Block Diagram
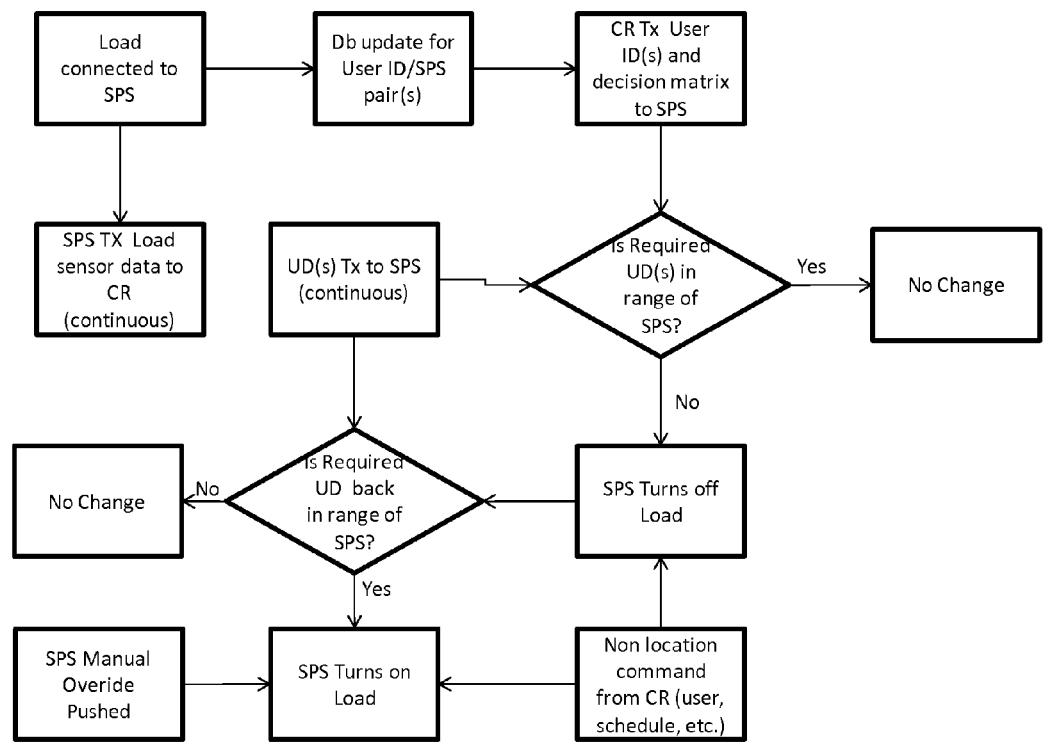
Figure 5– SPS sensed UD Proximity Flow Diagram

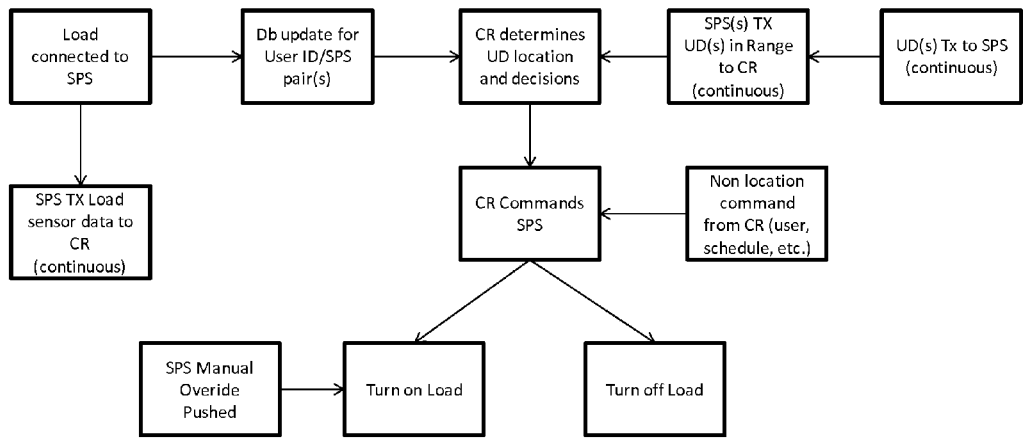
Figure 6– SPS reporting UD Proximity Flow Diagram
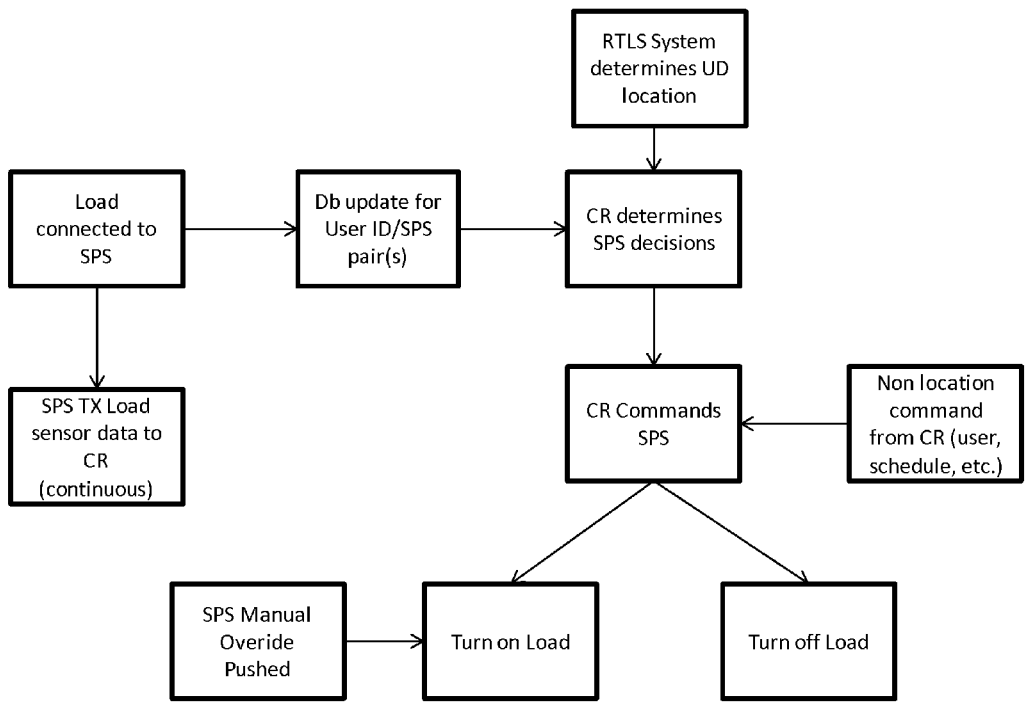
Figure 7–UD RTLS Flow Diagram

METHOD AND SYSTEM FOR UTILIZING A DEVICE'S USER LOCATION TO MONITOR AND CONTROL THE DEVICE POWER USAGE

CROSS-REFERENCE TO RELATED APPLICATIONS

This application for patent claims priority to, and incorporates herein by reference, U.S. Provisional Application Ser. No. 61/694,113, entitled "Method and System for utilizing a device's user location to monitor and control the device power usage," filed Aug. 28, 2012 with the United States Patent and Trademark Office.

BACKGROUND OF THE INVENTION

Accurate monitoring and control at the individual electrical device level provides a significant opportunity to limit electrical power utilization to the minimum necessary for the needs of the device user. In addition, most electrical devices require the close proximity of the end user to provide useful output (lights, monitors, space heaters). There are a number of devices currently available that offer limited monitoring and control of electrical devices based on schedules, sensing, or manual user configurations. Brambley et al. stated in their support for advanced sensors and controls that "controls appear to have the potential to significantly reduce commercial building energy consumption in the United States, but, at present, building controls have probably realized only a fraction of their national energy-savings potential. Overall, Energy Management Control Systems (EMCSs) manage only about one-third of commercial building floor space (~10% of all buildings), while more advanced control approaches have an even smaller market share".

The ability to provide significant monitoring and control at the individual plug node, sensed node or switched node level faces a number of challenges for both commercial and residential users. In order to solve these issues, the present invention provides a simple system for monitoring and controlling power to individual plug, sensed or switched loads based on the proximity of the user to the device thereby minimizing overall power utilization. Additional characteristics of the present invention include ease of installation and automation of controls to limit end user requirements, providing for cost-effective use.

SUMMARY OF THE INVENTION

An object of the present invention is to provide a system for monitoring and control of electrical devices' power utilization based on the device user or user's proximity to the device. An object of the invention is to control power to the electrical device in order to minimize the power consumption of the device and limit device utilization to its zone of effectiveness. Another object of the present invention is to provide a system to improve entire building monitoring and control by providing a mechanism to remotely monitor and control individual devices at the plug, sensed, or switch node level and to continuously report power consumption for devices for utilization monitoring, maintenance monitoring and system health monitoring.

To achieve these objectives, the present invention comprises an electrical interface unit for power consumption sensing, control and wireless communications [SPS] with a central receiving unit for data acquisition, data storage, data display, and control [CR] and an electronic user device or system to allow determination of the users location relative to the electrical device being used [UD].

DESCRIPTION OF THE DRAWINGS

FIG. 1 depicts the overall system block diagram showing the three primary components of the proposed invention to include; the Power sensing and control device (200) [SPS], the central control receiving unit (100) [CR], and the user locating device (300) [UD]. FIG. 1 also depicts the interface to the electrical device being monitored and controlled (400). Depending on configuration being used, FIG. 1 depicts the user locating device (300) as communicating either to the central control unit (100) or the power sensing and control device (200).

FIG. 2 depicts the various functional, physical and/or logical sub components that comprise the central control unit (100). FIG. 2 also depicts how these items logically interact with each other. This unit is hereafter referred to as the CR unit.

FIG. 3 depicts the various functional, physical and/or logical sub components that comprise the power sensing and control device. FIG. 3 also depicts how these items logically interact with each other. This unit is hereafter referred to as the SPS unit.

FIG. 4 depicts the various functional, physical and/or logical sub components that comprise the User location device (300). FIG. 4 also depicts how these items logically interact with each other. This unit is hereafter referred to as the UD unit.

FIG. 5 depicts the logical flow diagram for the configuration where the SPS directly senses the proximity of the UD and controls the power availability to the electrical device based directly on that proximity. In this configuration, after initial set up from the CR to the SPS, the CR is not required for any power control decisions and functions only in a passive monitoring capacity. The SPS is the active power control decision device based on information from the UD.

FIG. 6 depicts the logical flow diagram for the configuration where the SPS directly senses the proximity of the UD and reports the UD information to the CR where the CR determines the appropriate actions and commands the individual SPS controls. In this configuration, the CR is the active power control decision device based on the pass through UD data from the SPS.

FIG. 7 depicts the logical flow diagram for the configuration where a separate real time location system (not part of this present invention) determines the UD location and transmits that location to the CR which then determines the appropriate action and commands individual SPS controls. In this configuration, the CR is the active power control decision device based on UD data received separately from the SPS.

DETAILED DESCRIPTION

In the following description of the present invention there are multiple details established to provide a thorough understanding of the invention and the preferred implementations of the invention. It should be clear that the description is not intended to limit the invention to these specific embodiments and that variations, changes, substitutions, or equivalent components will be apparent to those skilled in the art and should not be considered significant differences from the intended scope of the invention.

The invention intends to monitor and control the use of electricity to electrical devices. The invention is intended to apply to the monitoring and control of any and all pluggable electrical devices, permanently installed buss bar connected electrical devices, permanently installed switch controlled electrical devices or permanently installed sensor controlled electrical devices. FIG. 1 depicts the interface between the power sensing device [SPS] (200) and the power utilization device (400) as well as the interfaces between the three primary units of the present invention. The arrows in FIG. 1 depict the flow of information from one subsystem to another. The dashed arrows in FIG. 1 depict that the information from the UD (300) can be transmitted either to the CR (100) or to the SPS (200) depending upon the desired configuration. The figure is also intended to convey that there can be multiple electrical devices connected to either a single or multiple SPSs and each SPS can work with either a single or multiple UDs.

The CR unit (100) is depicted in detail in FIG. 2. The CR consists of a central processor (150), an RF Transceiver (110), a database of the SPSs (120), a database of UDs (130), a database of power utilization for each node of the SPS (140), an interface for a local user to monitor and control the system (160), an internet connection (170), a remote user interface (180), and one or more decision algorithms (190).

The central processor (150), local user interface (160), various databases (120, 130, 140), internet connection (170) and decision algorithms (190) are intended to be comprised of a single personal computer, notebook, tablet or smart phone capable of hosting various software and providing display and human machine interfaces. The current embodiment utilizes a PC based system running widows 7 and utilizing various customized software for data acquisition, database storage, display, decision management, control and reporting. The SPS database (120) consists of tables of information on various SPS configurations, locations, communications protocols, sensor types, sensor calibration numbers, connected power utilization devices attached to the SPS, sensing limits and UD assignments. The End user database (130) consists of various tables of UD configuration, names of individuals assigned to the UD, communication protocols for each UD and time and sensor location of the sensed UD. The Power Usage database (140) consists of tables of information on power usage from each sensor on each SPS. This information includes unconverted transmitted data as well as converted data based on individual sensor calibration information. Sensor data is not limited to power sensing and may include environmental or motion sensing information. The decision algorithms (190) can consist of a variety of items but effectively use logical rules and the information from the individual databases to determine both the current state and the desired state of an individual control node. If the current state is different from the desired state, the central processor institutes a change communication to bring the node from the current state to the desired state.

The RF transceiver (110) is intended to be any one of a number of possible devices including proprietary RF communication, Wi-Fi, Bluetooth, UWB, ZigBee or other IEEE supported protocols. The device is in communication with the central processor through any one of a number of wired or wireless standard or proprietary protocols including USB, Wi-Fi, Bluetooth, UWB, ZigBee or other IEEE supported protocols.

If desired, the central processor can communicate through various wired or wireless standard or proprietary protocols (170) to a remote interface unit (180) allowing a physically remote user to monitor and control each of the SPS nodes independently through the internet or cell communications. The remote unit (180) can be another computer, tablet, smartphone or other device.

FIG. 3 depicts the individual logical and functional components of the SPS (200) to include and RF transceiver (210), various sensors (220), an interface to a power utilization device (230), logical memory (240), a microcontroller (250), relays to control power flow (260), decision algorithms (270), and a local override device (280). The microcontroller (250) provides the ability to communicate through the RF transceiver (210) to the UDs and the CR as well as the ability to interrogate the various sensors (220) and to use the decision algorithms (270) and memory (240) to properly interpret the sensed data and control the flow of electricity through the interface (230) by controlling the power relays (260). The current embodiment utilizes a System on a Chip (SOC) to encompass the functions of the RF transceiver (210), memory (240), and microcontroller (250). Furthermore the SOC provides the analog and digital interfaces to the sensors (220) and allows decision algorithms (270) to be stored in local memory (240). If required, the SPS can be battery powered or connected to a power source.

The sensors (220) can be current sensors, power sensors, temperature sensors, motion sensors, radiation sensors, or other sensors. They can have either a digital or analog interface to the microcontroller (250). The sensors work through the interface to the power utilization device to accurately monitor the amount of power being used by each device being sensed.

The power control relays (260) are used to interrupt or allow power to flow through the interface (230) to the power utilization device. The power relays can be controlled either by commands from the microcontroller (250) or from a local override device (280). The local override device (280) is a switch that turns power on or off to the interface (230) by overriding the command from the microcontroller (250).

The decision algorithms (270) can be either control algorithms for the relays (260) or can be algorithms for properly interpreting the sensor (220) data such as a peak detection algorithm or integration algorithm.

FIG. 4 depicts the various components associated with the UD (300). The UD is comprised of a microcontroller (340), and an RF transmitter (310). If required, the UD can include sensors (320) and/or local memory (330). The UD is intended to be battery powered and physically located with the user similar to an active RFID device.

The microcontroller (340) provides the ability to communicate through the RF transceiver (310) to the SPS and/or the CR as well as the ability to interrogate the various sensors (320) and to use a command set and memory (330) to properly interpret the sensed data. The current embodiment utilizes a System on a Chip (SOC) to encompass the functions of the RF transceiver (310), memory (330), and microcontroller (340). Furthermore the SOC provides the analog and digital interfaces to the sensors (320) and allows the command set to be stored in local memory (330). The current embodiment of the UD goes from a sleep mode to a wake mode approximately every 4 seconds. In wake mode the UD transmits the UD ID number and current battery level and returns to sleep mode. No acknowledgement of receipt of information is made to the UD. It is a 'dumb' asynchronous transmitter.

The devices described in FIGS. 1-4 can be utilized in a number of logical configurations to provide monitoring and control of electrical loads based on user proximity to the electrical device. FIG. 5 depicts the logical flow diagram for the first of 3 independent configurations for the present invention. In this configuration, the SPS (200) is connected to an electrical load desired to be sensed and controlled. The SPS information, load information and intended load user is uploaded to the CR. Based on its decision algorithm, the CR transmits control logic information to the SPS. The SPS begins to sense and transmit the power utilization information of each node to the CR for database storage, display and reporting. Through the SPS transceiver, the SPS listens for communication from the UD or UDs associated with the connected load. The UDs transmit their identification continuously. If the UDs are in and remain in range of the SPS, the SPS makes no change to the flow of electricity to the load. If the UDs go out of range of the SPS receiver for greater than a predetermined time period, the SPS utilizes its control algorithms to turn off the connected load until the UD(s) come back into range of the SPS. All power control decisions are accomplished by the SPS microcontroller without further communication to or from the CR. In this mode, the CR monitors changes but does not control the local SPS.

In the current embodiment whenever the UD signal is received by the SPS, an internal SPS timer is reset to indicate user presence. With the UD transmitting approximately every 4 seconds, this SPS internal timer is set to approximately 1 minute and must be reset by the receipt of the UD RF signal to continue to allow power to the controlled devices. If the SPS timer is not reset before it expires, power to the devices being controlled is removed and the SPS waits until it receives the UD signal before turning on power to the devices being controlled and resetting the timer.

In the current embodiment, the SPS cycle of listening for the UD's, monitoring the power load from its controlled devices, and transmitting its information to the CR, is approximately every 10 seconds. The SPS transmits the ID of any UD's heard in that 10 seconds, the power being used by the various SPS sensed loads, and the SPS ID information to the CR. The SPS information is transmitted to the CR asynchronously and without an acknowledgement from the CR.

If the user determines that the state of a given node is not what is desired they can utilize the manual override on the SPS to change the state of the node. In the current embodiment, the manual override changes the relay state but does not change the microcontroller sequence relative to it's decisions based on UD movement in and out of range. That is, after the manual override is used, the system automatically reverts to UD control upon the next full UD proximity detection change cycle (out/in/out or in/out/in). Various UD and SPS transmission times and ranges can be used to control sensitivity of the device to a state change. These are controlled through the various algorithms on the CR, UD and SPS.

FIG. 6 depicts a second logical flow diagram for a configuration where the control decisions are made not at the SPS but by the CR. In this configuration, the SPS transmits to the CR both the SPS sensors information and the UD ID numbers that it is receiving as before. No decision information is held by the SPS. No SPS internal timer is used to change relay positions. The CR utilizes the information received from all SPSs to determine the correct state for each SPS node and transmits that information to the various SPSs to change specific relays and either interrupt or allow power flow to end devices. Because there may be UD information from multiple SPSs, this configuration may allow for a higher level of control including better relative position determination between the UD and SPS.

FIG. 7 depicts a third configuration where the UD does not communicate in any way to the SPS but instead communicates its real time absolute location to the CR. The CR then determines the relative location of the UD to the SPS and commands any required state changes to the SPS nodes. This is intended to provide the highest possible level of control as well as allow for third party RTLS or location service systems to provide the necessary information, removing the need for a redundant UD.

All three configurations include the ability of the CR to command SPS nodes based on; commands from the CR user interface (permission controlled), scheduled commands, power usage rules such as maximum SPS power usage, or other logical requirements.

In the current embodiment if the CR transmits information to an SPS, the SPS sends the received command ID number back to the CR for the next 3 standard transmissions to the CR. In this way, the CR ensures the SPS state and control logic is as desired. In addition, in the current embodiment, the CR can command the SPS to transmit its memory load information to allow monitoring of UD and SPS control information directly by the CR. All three configurations allow the local user to utilize the override system.

The preferred embodiment of the SPS includes either a smart power strip or smart outlet for plugged loads, a smart switch for switched loads or a smart thermostat for sensed nodes. The smart outlet and smart switch can take the form of a standard AC box unit such that no difference to the end user is perceived. The intended embodiment of the UD includes a key fob or security card device for any of the three depicted configurations. In addition, the UD can take the form of a cell phone, smartphone, or other personal electronic device transmitting RF signals.

What is claimed is:

1. An autonomous system for managing power distribution to an electrically-powered device comprising:
   a power controller module, said power controller module including power input means, power output means, and intervening, operably connected, integral power switching means,
   said integral power switching means being configured for actuation by an integral power management module operably connected with said integral power switching means, said integral power management module including integral actuation signal detection and actuation means configured for, in accordance with commands and operational parameters, upon detection of an actuating signal, actuating said integral power switching means to alter power output through said power output means from a first power output level to a second power output level;
   said integral power control module having integral, operably integrated memory means for non-volatile storing all of said commands and operational parameters for effecting said altering of said power output through said power output means, said memory means being operably connected with said integral actuation signal detection and actuation means;
   an active RFID transmitter, said RFID transmitter being configured for substantially, continuously repetitive transmitting of a said actuation signal;
   wherein said active RFID transmitter and said integral actuation signal detection and actuation means are respectively configured for transmitting of, and actuation by an actuation signal, said actuation signal including an identification component for identifying a said actuating signal as a said actuation signal; and
   wherein said integral actuation signal detection and actuation means is configured for, upon detecting signals that are other than actuation signals, reacting other than in response to a said actuation signal.

2. The system of claim 1 wherein said integral power switching means is configured for governing current flow from said power input means to said power output means and a plurality of intermediate power output levels between substantially, fully terminated power flow to substantially, fully unrestricted power flow.

3. The system of claim 2 wherein said integral power management module is further includes integral network communications interface means, and wherein said power management module is further configured for receiving, through said network communications interface means, said commands and operational.

4. Method for managing power distribution to an electrically-powered device through use of modular, autonomously operable controller-device assemblies comprising the steps of:

selecting a power controller module, said power controller module including power input means, power output means, and intervening, operably connected, integral power switching means, said integral power switching means being configured for actuation by an integral power management module operably connected with said integral power switching means, said integral power management module including integral actuation signal detection and actuation means configured for, in accordance with commands and operational parameters, upon detection of an actuating signal, actuating said integral power switching means to alter power output through said power output means from a first power output level to a second power output level;

said integral power control module having integral, operably integrated memory means for non-volatile storing all of said commands and operational parameters for effecting said altering of said power output through said power output means, said memory means being operably connected with said integral actuation signal detection and actuation means;

an active RFID transmitter, said RFID transmitter being configured for substantially, continuously repetitive transmitting of a said actuation signal;

wherein said active RFID transmitter and said integral actuation signal detection and actuation means are respectively configured for transmitting of, and actuation by an actuation signal, said actuation signal including an identification component for identifying a said actuating signal as a said actuation signal; and wherein said integral actuation signal detection and actuation means is configured for, upon detecting signals that are other than actuation signals, reacting other than in response to a said actuation signal;

connecting said power input means to a electrical power source; and connecting an electrically-powered device to said power output means.

5. The method of claim 4 wherein said power switching means is configured for governing current flow from said power input means to said power output means and a plurality of intermediate power output levels between substantially, fully terminated power flow to substantially, fully unrestricted power flow.

* * * * *